United States Patent [19]

Jäckel et al.

[11] 4,336,309
[45] Jun. 22, 1982

[54] CURABLE COATING AGENTS AND PROCESS FOR THE PRODUCTION OF SCRATCH-RESISTANT COATINGS ON PLASTICS

[75] Inventors: Klaus-Peter Jäckel, Limburgerhof; Günter Heil, Ludwigshafen; Herbert Spoor, Limburgerhof, all of Fed. Rep. of Germany

[73] Assignee: BASF Aktiengesellschaft, Fed. Rep. of Germany

[21] Appl. No.: 204,539

[22] Filed: Nov. 6, 1980

[30] Foreign Application Priority Data

Nov. 17, 1979 [DE] Fed. Rep. of Germany ....... 2946474

[51] Int. Cl.³ .................. B32B 9/04; C08G 77/18; C08G 77/20; B05D 3/06
[52] U.S. Cl. .................................. 428/447; 427/44; 427/54.1; 427/387; 525/26; 525/32
[58] Field of Search ................. 427/44, 54.1, 387; 528/32, 26; 428/447

[56] References Cited

U.S. PATENT DOCUMENTS

| | | | |
|---|---|---|---|
| 3,398,210 | 8/1968 | Plueddemann et al. | 528/32 |
| 3,453,230 | 7/1969 | Plueddemann | 528/32 |
| 3,577,262 | 5/1971 | Nordstrom | 117/93.31 |
| 3,577,263 | 5/1971 | Nordstrom | 117/93.31 |
| 3,577,265 | 4/1971 | Nordstrom | 117/93.31 |
| 3,585,065 | 6/1971 | Johnson | 260/93.31 |
| 3,709,956 | 1/1973 | Nordstrom | 260/827 |
| 3,714,288 | 1/1973 | Nordstrom | 204/109.15 |
| 3,746,567 | 7/1973 | Nordstrom | 117/93.31 |
| 4,043,953 | 8/1977 | Chang et al. | 528/32 |

FOREIGN PATENT DOCUMENTS

| | | |
|---|---|---|
| 1957356 | 7/1970 | Fed. Rep. of Germany . |
| 1957357 | 8/1970 | Fed. Rep. of Germany . |
| 1957358 | 8/1970 | Fed. Rep. of Germany . |

*Primary Examiner*—Wilbert J. Briggs, Sr.
*Attorney, Agent, or Firm*—Keil & Witherspoon

[57] ABSTRACT

Curable coating agents, a process for the production of scratch-resistant coatings on plastics, and articles coated by this process.

The coating agents are polycondensates of
- a reaction product, containing two or more carbon-carbon double bonds and one or more hydroxyl or alkoxy groups per molecule, obtained from an olefinically unsaturated silane containing 2 or more hydroxyl or alkoxy groups, whose olefinically unsaturated organic radical is bonded via a C-Si bond, and a hydroxyl-containing $\alpha, \beta$-olefinically unsaturated monomer,
- an olefinically unsaturated silane of the general formula $$R^1\text{—Si}(OR^2)_3$$

where $R^1$ is a vinyl radical or an alkyl acrylate or alkyl methacrylate radical bonded to the Si atom via a C—Si bond and $R^2$ is hydrogen or a saturated hydrocarbon radical, and
- a saturated silane of the general formula $$R^3\text{—}\underset{\underset{OR^2}{|}}{\overset{\overset{R^4}{|}}{Si}}\text{—}OR^2$$

where $R^3$ and $R^4$ are saturated or aromatic hydrocarbon radicals, with or without an epoxide-containing silane which also contains hydroxyl or alkoxy groups; the polycondensate may additionally contain an olefinically unsaturated reaction product of acrylic or methacrylic acid and a polyalcohol or polyether-ol.

The coating agent is used to produce scratch-resistant coatings on the surface of plastics.

5 Claims, No Drawings

CURABLE COATING AGENTS AND PROCESS FOR THE PRODUCTION OF SCRATCH-RESISTANT COATINGS ON PLASTICS

The present invention relates to curable coating agents based on olefinically unsaturated polysiloxanes, processes for the production of scratch-resistant coatings on plastics, by using these coating agents, and the plastics coated by these processes.

German Published Application DAS No. 1,957,357 discloses reaction products of unsaturated siloxanes with olefinically unsaturated epoxy resins and/or olefinically unsaturated diurethanes, and their curing by electron beams.

A similar curable system, which consists of an olefinically unsaturated siloxane and an $\alpha,\beta$-olefinically unsaturated polyester, is described in German Published Application DAS No. 1,957,358. The films produced are well-cured and weathering-resistant, but are definitely unsatisfactory in respect of abrasion resistance and scratch resistance. For example, the cured films are required, inter alia, to have a pencil hardness of 9H, and the prior-art coatings fall far short of this, as is shown by Example 1 of German Published Application DAS No. 1,957,358 (pencil hardness H).

It is an object of the present invention to provide coating agents, especially for use on plastics such as polymethyl methacrylate, polycarbonates, polystyrene, styrene/acrylonitrile copolymers and polyvinyl chloride, which in addition to having good adhesion, transparency and levelling possess excellent abrasion resistance and scratch resistance. These coatings are intended substantially to improve the mechanical resistance of the surface of the plastics, so as to permit transparent plastics to be used as a substitute for glass, especially in the automobile industry.

We have found that this object is achieved by curable coatings based on olefinically unsaturated polysiloxanes, wherein the olefinically unsaturated polysiloxane is a polycondensate of (a) from 1 to 40% by weight of a reaction product containing two or more carbon-carbon double bonds and one or more hydroxyl and/or alkoxy groups per molecule, obtained from an olefinically unsaturated silane containing 2 or more hydroxyl or $C_1$–$C_4$-alkoxy groups, whose olefinically unsaturated organic radical is bonded via a C—Si bond, and a hydroxyl-containing $\alpha,\beta$-olefinically unsaturated monomer, (b) from 20 to 80% by weight of an olefinically unsaturated silane of the general formula

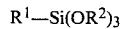

$$R^1-Si(OR^2)_3$$

where $R^1$ is a vinyl or $C_2$–$C_8$-alkyl acrylate or methacrylate radical bonded to the Si atom via a C—Si bond and $R^2$ is hydrogen or a saturated hydrocarbon radical of 1 to 4 carbon atoms, (c) from 5 to 55% by weight of a saturated silane of the general formula

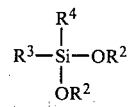

$$R^3-\underset{\underset{OR^2}{|}}{\overset{\overset{R^4}{|}}{Si}}-OR^2$$

where $R^2$ has the above meanings and $R^3$ and $R^4$ are identical or different and each is a saturated hydrocarbon radical of 1 to 6 carbon atoms or an unsubstituted or $C_1$–$C_4$-alkyl-substituted aromatic hydrocarbon radical, and (d) from 0 to 30% by weight of an epoxide-containing silane containing 2 or more hydroxyl or $C_1$–$C_4$-alkoxy groups, as well as by curable coating agents of the same type which additionally contain an olefinically unsaturated reaction product of acrylic acid or methacrylic acid and a polyalcohol or polyether-polyol, in an amount of up to 800 percent by weight, based on the weight of the polycondensate.

The present invention further relates to a process for the production of scratch-resistant coatings on the surfaces of plastics, wherein a curable coating agent according to the invention is applied in a conventional manner to the surface of a plastic and is cured by ionizing radiation, by exposure to heat in the presence of a free radical initiator or initiator system, or by irradiation with ultraviolet light in the presence of conventional photoinitiators.

The invention also relates to articles made from plastics and coated by the above process.

Using the novel coating agents it proves possible, surprisingly, to obtain coatings, on plastics, which after curing by ionizing radiation, ultraviolet radiation or heat are transparent, adhere very firmly, are very hard and possess excellent abrasion resistance and scratch resistance.

The following details may be noted with respect to the constituents of the novel coating agents.

The olefinically unsaturated polysiloxane is a polycondensate of components (a), (b) and (c), with or without (d).

(a) Examples of suitable reaction products, containing two or more carbon-carbon double bonds and one or more hydroxyl and/or alkoxy groups per molecule, of an olefinically unsaturated silane which contains 2 or more hydroxyl or $C_1$–$C_4$-alkoxy groups and whose olefinically unsaturated organic radical is bonded via a C—Si bond, with a hydroxyl-containing $\alpha,\beta$-olefinically unsaturated monomer are reaction products of hydroxyalkyl acrylates or methacrylates, alkyl being of 2 to 8 carbon atoms, e.g. hydroxyethyl acrylate or methacrylate or 2-hydroxypropyl acrylate or methacrylate, with an olefinically unsaturated silane whose olefinically unsaturated organic radical is bonded via a C—Si bond and which contains 2 or more hydroxyl groups or alkoxy groups of 1 to 4 carbon atoms.

The olefinically unsaturated silanes suitable for the preparation of component (a) for example contain, as olefinically unsaturated radicals, vinyl radicals or acryloxyalkyl or methacryloxyalkyl radicals, where alkyl is of 2 to 6, preferably of 2 to 4, carbon atoms, and, as alkoxy groups, those of 1 to 4, preferably of 1 or 2, carbon atoms.

Examples of olefinically unsaturated silanes which are particularly suitable for the preparation of component (a) are vinyltrimethoxysilane, vinyltriethoxysilane, $\gamma$-methacryloxypropyltrimethoxysilane and $\gamma$-methacryloxypropyltriethoxysilane.

To prepare component (a), the olefinically unsaturated silane is reacted with the hydroxyalkyl acrylate or methacrylate in a molar ratio of the former to the latter of from 1:1 to 1:2. This reaction is advantageously carried out at from 65° to 170° C., preferably at from 80° to 150° C., in the presence or absence of a solvent, such as toluene or xylene, and of an esterification catalyst, such as hydrochloric acid, sulfuric acid, p-toluenesulfonic acid, tetraisopropyl titanate and the like.

In the preparation of the novel polycondensates, component (a) is employed in an amount of from 1 to 40, preferably from 5 to 25, % by weight based on the sum of the percentages of (a)+(b)+(c)+(d).

(b) Examples of suitable olefinically unsaturated silanes of the general formula $$R^1-Si(OR^2)_3$$

where $R^1$ is a vinyl radical, or alkyl acrylate or alkyl methacrylate radical, alkyl being of 2 to 8 carbon atoms, bonded to the Si atom via a C—Si bond, and $R^2$ is hydrogen or a saturated hydrocarbon radical of 1 to 4 carbon atoms are vinyltrimethoxysilane, vinyltriethoxysilane, γ-methacryloxypropyltrimethoxysilane and γ-methacryloxypropyltriethoxysilane, amongst which vinyltriethoxysilane and γ-methacryloxypropyltrimethoxysilane are preferred.

In preparing the novel polycondensates, component (b) is employed in an amount of from 20 to 80, preferably from 35 to 70, % by weight, based on the sum of the percentages of (a)+(b)+(c)+(d).

(c) Examples of suitable saturated silanes of the general formula $$R^3-\underset{\underset{R^2}{|}}{\overset{\overset{R^4}{|}}{Si}}-OR^2$$

where $R^2$ has the above meanings and $R^3$ and $R^4$ are identical or different and each is a saturated hydrocarbon radical of 1 to 6 carbon atoms or an unsubstituted or $C_1$-$C_4$-alkyl-substituted aromatic hydrocarbon radical are dimethyldimethoxysilane, dimethyldiethoxysilane, dimethyldibutoxysilane, diphenyldimethoxysilane, diphenyldiethoxysilane and diphenyldibutoxysilane. Dimethyldibutoxysilane is particularly preferred. Because of its bifunctional character, component (c) results in a deliberate linear structure of the novel polycondensate. It is employed in an amount of from 5 to 55, preferably from 20 to 40, % by weight, based on the sum of the percentages of (a)+(b)+(c)+(d).

(d) Examples of suitable epoxide-containing silanes containing 2 or more hydroxyl or alkoxy groups are γ-glycidoxypropyltrialkoxysilanes, where alkoxy is of 1 to 4 carbon atoms, e.g. γ-glycidoxypropyltrimethoxysilane, γ-glycidoxypropyltriethoxysilane and γ-glycidoxypropyltributoxysilane, β-(3,4-epoxycyclohexyl)-ethyltrialkoxysilanes, where alkoxy is of 1 to 4 carbon atoms, e.g. β-(3,4-epoxycyclohexyl)-ethyltrimethoxysilane, -triethoxysilane and -tributoxysilane, and mixtures of these compounds. Preferably, component (d) is γ-glycidoxypropyltrimethoxysilane.

In preparing the novel polycondensates, component (d) may be used in amounts of from 0 to 30, preferably from 5 to 20, % by weight, based on the sum of the percentages of (a)+(b)+(c)+(d). The presence of component (d) contributes to improving the adhesion of the coating to the substrate.

To prepare the novel coating agents, components (a) to (d) are co-condensed in the presence of an acid catalyst, and advantageously in the presence of not less than a 5-fold molar excess of water, the entire reaction mixture first being heated at 50°–80° C. for about 4–8 hours and the alcohol formed then being distilled off, as an alcohol-water azeotrope, partially under atmospheric pressure and partially under reduced pressure.

Suitable catalysts for the condensation are the conventional organic and inorganic compounds, e.g. acid catalysts such as p-toluenesulfonic acid, hypophosphorous acid, hydrochloric acid and sulfuric acid, or other catalysts such as vanadium pentoxide and antimony trioxide.

The resulting novel polycondensate can be processed either undiluted or in solution. Suitable organic solvents are, in particular, aromatic hydrocarbons, esters, ketones, alcohols and mixtures of these, provided they do not attack the plastic substrate which is to be coated. Particularly suitable solvents are alcohols, e.g. i-propanol and n-butanol.

The novel polysiloxanes contain the following types of units:

$$R^1-\underset{\underset{O}{|}}{\overset{\overset{O}{|}}{Si}}-O-$$

$$(R^5O)_n\underset{}{\overset{\overset{R^1}{|}}{Si}}O_{\frac{3-n}{2}}$$

$$-O-\underset{\underset{R^4}{|}}{\overset{\overset{R^3}{|}}{Si}}-O- \quad \text{with or without} \quad R^6-\underset{\underset{O}{|}}{\overset{\overset{O}{|}}{Si}}-O-$$

where n is 1 or 2, $R^1$, $R^3$ and $R^4$ have the above meanings, $R^5$ is a radical of an ester of acrylic acid or methacrylic acid with a diol of 2 to 8 carbon atoms, and $R^6$ is an epoxide-containing organic ether radical, comprising a glycidyl group and an ether radical of 2 to 8 carbon atoms.

The novel polycondensates in general have molecular weights of from 500 to 10,000, preferably from 800 to 3,000.

Monomers with multiple olefinic unsaturation may be added to the novel polysiloxane to act as crosslinking components, for example monomers obtained by reaction of acrylic acid or methacrylic acid with polyols or polyether-ols. Preferred monomers of this type are the diacrylates and dimethacrylates of ethylene glycol, propanediol, butanediol, diethylene glycol, triethylene glycol and tetraethylene glycol, butanediol diacrylate and tetraethylene glycol diacrylate being particularly preferred.

These additional crosslinking components can be present in up to an eight-fold excess, preferably from 1-fold to 6-fold excess by weight, based on the novel olefinically unsaturated polysiloxane.

The novel coating agents may be used to produce scratch-resistant coatings on the surfaces of plastics, e.g. on polymethyl methacrylate, polycarbonate, polystyrene, styrene/acrylonitrile copolymers and polyvinyl chloride.

The coating agents are applied to the substrate by conventional methods such as spraying, knife-coating or dipping, the coating thickness being, for economic reasons, not more than 50 μm.

The coating films are preferably cured by means of ionizing radiation, especially in the form of electron beams having an average energy of from 100,000 to 250,000 electron volt. The total dosage of this radiation is in general from 3 to 20 Mrad.

Suitable radiation sources are those conventionally used for electron beam curing of surface-coatings.

High-energy light (ultraviolet radiation) in combination with conventional photoinitiators, eg. benzophenone, benzil dimethyl ketal, 2-hydroxy-2-methylpropiophenone, thioxanthone and its derivatives, benzoin alkyl ethers and combinations of these photoinitiators with synergistic agents (for example tertiary amines) can also initiate the crosslinking reaction which causes the novel coatings to cure.

The novel coatings can however also be cured thermally in the presence of free radical initiators or initiator systems, for example by peroxide-initiated polymerization. Particularly preferred peroxides are those which have a half-life of at most 1 hour at 60°–120° C. and in addition to causing crosslinking of the coating film also allow grafting reactions of the coating to the substrate to take place. Preferred peroxides are tert.-butyl perbenzoate, tert.-butyl peroctoate, cyclohexanone peroxide and tert.-butyl perpivalate. The atmospheric oxygen can be bound as a complex by adding cobalt salts, e.g. cobalt octoate, cobalt naphthenate and the like, so that its inhibiting action on the crosslinking reaction is greatly reduced. Furthermore, cobalt salts accelerate, through complex formation, the decomposition of the peroxide initiator. The curing temperatures are from 60° to 120° C., preferably from 80° to 100° C. The curing time is at most 2 hours and depends on the amount of cobalt salt added.

Before coating, it is advantageous to carefully clean and dry the surface of the plastic. This may be done, for example, by first washing the articles with detergent-containing water, then with alcohol or other organic solvents which do not attack the surface, so as to remove organic impurities, and then drying for 30 minutes at 50° C. Advantageously, the articles which have been cleaned in this way are kept in a dessicator or similar container until the coating operation is carried out.

The Examples which follow illustrate the novel coatings. Parts and percentages are by weight.

I. Preparation of component (a)

EXAMPLE 1

56.1 parts of vinyltrimethoxysilane (VTMO) and 43.9 parts of hydroxyethyl acrylate (HEA) are heated, in the presence of 0.5% of p-toluenesulfonic acid and 0.1% of methylhydroxyquinone, for 3 hours at 120° C., whilst stirring. The methanol formed is distilled off first under atmospheric pressure and then under slightly reduced pressure, using a distillation apparatus with a packed column. Thereafter, the unconverted starting materials are removed from the reaction mixture by further reducing the pressure to about 10 mm Hg.

EXAMPLE 2

46 parts of VTMO and 54 parts of HEA are condensed by the method described in Example 1.

EXAMPLE 3

39 parts of VTMO and 61 parts of HEA are reacted by the method described in Example 1.

EXAMPLE 4

53.2 parts of VTMO and 46.8 parts of hydroxypropyl acrylate (HPA) are reacted by the method described in Example 1.

EXAMPLE 5

43.2 parts of VTMO and 56.8 parts of HPA are condensed by the method described in Example 1.

II. Preparation of the novel polycondensates:

EXAMPLES 6–15

The monomer combinations of Examples 6 to 15, listed in Table 1, are condensed as follows, to give unsaturated polysiloxanes:

The silanes are stirred with water (10-fold molar excess) and 0.02% by weight of silanes of vanadium pentoxide for 5 hours at 50° C. The alcohol formed is then distilled off, together with the excess water, as an azeotrope at a bath temperature of 110° C., the distillation being carried out toward the end under reduced pressure. The product can be used either undiluted or as a solution in i-propanol.

TABLE 1

| Example No. | Monomers | | | | Unsaturated silane from | | | | |
|---|---|---|---|---|---|---|---|---|---|
| | MEMO[1] | VTMO[2] | DMDBO[3] | GLYMO[4] | Example 1 | Example 2 | Example 3 | Example 4 | Example 5 |
| 6 | 66.4 | — | 27.3 | — | 6.3 | — | — | — | — |
| 7 | 62.5 | — | 25.7 | — | 11.8 | — | — | — | — |
| 8 | 66.4 | — | 27.3 | — | — | — | 6.3 | — | — |
| 9 | 55.9 | — | 23.0 | — | — | — | 21.1 | — | — |
| 10 | 66.4 | — | 27.3 | — | — | — | — | 6.3 | — |
| 11 | 62.5 | — | 25.7 | — | — | — | — | 11.8 | — |
| 12 | 38.7 | — | 31.8 | 8.6 | — | 20.9 | — | — | — |
| 13 | 66.4 | — | 27.3 | — | — | — | — | — | 6.3 |
| 14 | — | 54.2 | 37.3 | — | — | — | — | 8.5 | — |
| 15 | — | 44.0 | 30.4 | 18.7 | — | — | — | 6.9 | — |

[1] γ-methacryloxypropyltrimethoxysilane
[2] vinyltrimethoxysilane
[3] dimethyldibutoxysilane
[4] γ-glycidyloxypropyltrimethoxysilane

III. Production of the coatings

EXAMPLES 16–25

The binders described in Examples 6 to 15 were mixed, undiluted, with tetraethylene glycol diacrylate (TEGDA) in the ratio shown in Table 2. Each mixture was knife-coated onto a carefully cleaned polymethyl methacrylate sheet (=PMMA), the average coating thickness being 20 μm. The coating was cured in an N₂ atmosphere by means of an electron beam, the total dose being 10.6 Mrad. The scratch resistance of the coating films was tested in the Taber abraser test described in ASTM D 1044 (abrading rollers: CS-10F; load per roller: 500 g; number of cycles: 250). The scratch resistance was determined by measuring the cloudiness, in accordance with ASTM D 1003, using an AUX-10 cloudiness-measuring instrument from Gardner. To do this, the scratched coating film, on the substrate, was brought into the path of a parallel light beam and the percentage of scattered light deviating by more than 4° from the horizontal was taken, after deduction of the zero value, as a measure of the scratch resistance. The adhesion was determined by the DIN No. 53,151 cross-hatch method, with the modification that, additionally, self-adhesive tape was stuck over the hatched squares and was abruptly pulled off again.

The measured adhesion and scratch resistance data are shown in Table 2.

TABLE 2

| Example No. | Binder from Example | Binder: TEGDA ratio(1) | Δ % cloudiness | Adhesion |
|---|---|---|---|---|
| 16 | 6 | 1:5 | 0.9 | 0 |
| 17 | 7 | 1:2 | 0.6 | 0 |
| 18 | 8 | 1:3 | 0.6 | 0 |
| 19 | 9 | 1:3 | 0.6 | 0 |
| 20 | 10 | 1:6 | 0.6 | 0 |
| 21 | 11 | 1:2 | 0.5 | 0 |
| 22 | 12 | 1:2 | 1.0 | 0 |
| 23 | 13 | 1:3 | 0.8 | 0 |
| 24 | 14 | 1:4 | 1.0 | 0 |
| 25 | 15 | 1:2 | 0.8 | 0 |

(1)TEGDA = tetraethylene glycol diacrylate

The cured coating films were not attacked by organic solvents, such as toluene, acetone, butyl acetate, butanol and mineral spirit, even after 24 hours' exposure.

EXAMPLE 26

1 part of the polysiloxane from Example 10 was mixed with 1 part of tetraethylene glycol diacrylate. 2% of cyclohexanone peroxide and 2% of a 1% strength solution of cobalt octoate in styrene were added to this mixture. The PMMA sheet was coated by dipping the substrate in the coating mixture, and the coating was cured for 2 hours at 100° C. A hard coating having good scratch resistance (Δ% cloudiness after 250 cycles=1.8) was obtained.

We claim:

1. A curable coating agent based on an olefinically unsaturated polysiloxane, wherein the olefinically unsaturated polysiloxane is a polycondensate of
(a) from 1 to 40% by weight of a reaction product containing two or more carbon-carbon double bonds and one or more hydroxyl and/or alkoxy groups per molecule, obtained from an olefinically unsaturated silane containing 2 or more hydroxyl or $C_1$-$C_4$-alkoxy groups, whose olefinically unsaturated organic radical is bonded via a C—Si bond, and a hydroxyl-containing α,β-olefinically unsaturated monomer,
(b) from 20 to 80% by weight of an olefinically unsaturated silane of the general formula $$R^1-Si(OR^2)_3$$

where $R^1$ is a vinyl or $C_2$-$C_8$-alkyl acrylate or methacrylate radical bonded to the Si atom via a C—Si bond and $R^2$ is hydrogen or a saturated hydrocarbon radical of 1 to 4 carbon atoms,
(c) from 5 to 55% by weight of a saturated silane of the general formula $$R^3-\underset{\underset{OR^2}{|}}{\overset{\overset{R^4}{|}}{Si}}-OR^2$$

where $R^2$ has the above meanings and $R^3$ and $R^4$ are identical or different and each is a saturated hydrocarbon radical of 1 to 6 carbon atoms or an unsubstituted or $C_1$-$C_4$-alkyl-substituted aromatic hydrocarbon radical, and
(d) from 0 to 30% by weight of an epoxide-containing silane containing 2 or more hydroxyl or $C_1$-$C_4$-alkoxy groups.

2. A curable coating agent as claimed in claim 1, which additionally contains an olefinically unsaturated reaction product of acrylic acid or methacrylic acid and a polyalcohol of polyether-ol, in an amount of up to 800 percent by weight, based on the weight of the polycondensate.

3. A process for producing a scratch-resistant coating on the surface of a plastic, wherein a curable coating agent as claimed in claim 1 is applied in a conventional manner to the surface of a plastic and is cured by ionizing radiation, by exposure to heat in the presence of a free radical initiator or initiator system, or by irradiation with ultraviolet light in the presence of conventional photoinitiators.

4. A process for producing a scratch-resistant coating on the surface of a plastic, wherein a curable coating agent as claimed in claim 2 is applied in a conventional manner to the surface of a plastic and is cured by ionizing radiation, by exposure to heat in the presence of a free radical initiator or initiator system, or by irradiation with ultraviolet light in the presence of conventional photoinitiators.

5. A plastic article coated by a process as claimed in claim 3 or 4.

* * * * *